US012766483B2

(12) United States Patent
Khonain

(10) Patent No.: US 12,766,483 B2
(45) Date of Patent: Oct. 20, 2026

(54) REDUCED GRAPHENE OXIDE SCREEN

(71) Applicant: SAUDI ARABIAN OIL COMPANY, Dhahran (SA)

(72) Inventor: Bander A. Khonain, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 930 days.

(21) Appl. No.: 18/061,911

(22) Filed: Dec. 5, 2022

(65) Prior Publication Data

US 2024/0181423 A1 Jun. 6, 2024

(51) Int. Cl.

*B01J 20/20* (2006.01)
*B01J 20/28* (2006.01)
*C10G 25/00* (2006.01)

(52) U.S. Cl.

CPC ......... *B01J 20/20* (2013.01); *B01J 20/28033* (2013.01); *C10G 25/003* (2013.01); *C10G 2300/205* (2013.01)

(58) Field of Classification Search

CPC ... B01J 20/20; B01J 20/28033; C10G 25/003; C10G 2300/205

See application file for complete search history.

(56) References Cited

U.S. PATENT DOCUMENTS

| | | | |
|---|---|---|---|
| 8,021,960 B2 | 9/2011 | Takemura | |
| 10,092,882 B2 | 10/2018 | Yu | |
| 11,015,128 B1 | 5/2021 | Zoican-Loebick et al. | |
| 2013/0192461 A1* | 8/2013 | Miller | B01D 53/229 95/55 |
| 2014/0199777 A2 | 7/2014 | Ruiz et al. | |
| 2018/0161736 A1* | 6/2018 | Coignet | B01D 63/0233 |
| 2019/0070533 A1* | 3/2019 | Cheng | C02F 1/02 |
| 2019/0143276 A1* | 5/2019 | Liu | B01D 71/0211 210/483 |
| 2020/0261858 A1* | 8/2020 | Seo | B01D 67/0072 |
| 2021/0023507 A1 | 1/2021 | Lee et al. | |

FOREIGN PATENT DOCUMENTS

| | | |
|---|---|---|
| CN | 206560714 U | 10/2017 |
| WO | 2017180141 A1 | 10/2017 |
| WO | 2019139435 A1 | 7/2019 |

OTHER PUBLICATIONS

Jamrozik, "Graphene and Graphene Oxide in the Oil and Gas Industry," AGH Drilling, Oil, Gas, vol. 34, No. 3, 2017, 14 pages.

(Continued)

*Primary Examiner* — Stuart L Hendrickson
(74) *Attorney, Agent, or Firm* — Osha Bergman Watanabe & Burton LLP

(57) ABSTRACT

Described is a reduced graphene oxide screen for use in an electrical submersible pump (ESP) system. The reduced graphene oxide screen includes an exterior wall and an interior wall. Multiple holes are distributed throughout the exterior and interior walls, and the holes in each of the walls are substantially aligned. A reduced graphene oxide mesh is positioned between the exterior wall and the interior wall. The reduced graphene oxide screen may be positioned around a pump intake to prevent emulsions from entering the ESP system.

4 Claims, 4 Drawing Sheets

(56) References Cited

OTHER PUBLICATIONS

Lu et al., "The coating and reduction of graphene oxide on meshes with inverse wettability for continuous water/oil separation," Applied Surface Science, vol. 538, Feb. 1, 2021, 147948, 7 pages.
Thickett et al., "Graphene Oxide (GO) Nanosheets as Oil-in-Water Emulsion Stabilizers: Influence of Oil Phase Polarity," J Colloid Interface Sci 442: 67-74, Nov. 19, 2014, 31 pages.
Office Action issued in Saudi Arabian Application No. 123450982, mailed on Oct. 14, 2025 (16 pages).

* cited by examiner

REDUCED GRAPHENE OXIDE SCREEN

BACKGROUND

The first stage of hydrocarbon production, also called primary production, is for displacing hydrocarbons from the reservoir into the wellbore and up to the surface by natural reservoir energy, such as gas drive, water drive, or gravity drainage. Initially, the reservoir pressure is higher than the pressure at the bottom of the wellbore. This differential pressure drives hydrocarbons toward the well and up to the surface. Hydrocarbon production lowers the reservoir pressure, and consequently the differential pressure. To increase the hydrocarbon production, an artificial lift system, such as a rod pump, an electrical submersible pump (ESP) system, or a gas-lift installation, is used. The primary production declines either when the reservoir pressure is so low that the production rates are not economical, or when the proportions of gas or water in the production stream are too high.

The second stage of hydrocarbon production, also called secondary production, sustains the hydrocarbon production at viable rates when the flow rate of the primary production declines. The secondary production also involves an ESP or reservoir injection for pressure maintenance. During secondary production from an oil well, the ESP system is added to the completion string downhole in order to increase the pressure of the downhole fluids, such that hydrocarbons can be produced and recovered on the surface.

The fluids pumped through the ESP are often a multiphase mixture of oil, gas, and water. The presence of gas flowing through the ESP can cause a reduction in liquid production efficiency, degrade the power efficiency of the pumping system, and lead to early failures of the downhole pump. If the amount of gas in the multiphase fluid mixture is allowed to increase without a source of feedback controlling the ESP operation, detrimental pumping situations may occur, such as: gas breakout, gas surging, and gas locking of the pump system.

Downhole equipment and ESP operations that cause mixing can result in the formation of emulsions due to the existence of oil and water in the produced fluid. Lifting emulsified liquids is more difficult than lifting non-emulsified liquids. Common problems due to emulsions include pipeline corrosion, decreased production, and pump failure. Current methods to mitigate emulsions include treatment with chemical demulsifier formulations. However, determining the appropriate treatment and dosage is time-consuming, and treatment with the incorrect formulation and/or dosage of chemicals may have adverse effects on the downhole equipment and ESP operations.

Graphene is a basic unit of all carbon nanostructures. Its structure consists of a two-dimensional monolayer of carbon atoms organized in a flat crystalline network. Graphene is highly resistant to chemicals, temperature, water, and organic solvents. The oxidation of graphene produces single-atom carbon layers of graphene oxide. Graphene oxide is used to produce strong paper-like materials, membranes, and films.

Reduced graphene oxide is produced through the processing of graphene oxide by various methods. Unlike graphene oxide, reduced graphene oxide lacks oxygen-containing functional groups. One difference between graphene oxide and reduced graphene oxide is that graphene oxide is highly dispersible in water and other solvents while reduced graphene oxide is less dispersible. Additionally, reduced graphene oxide is more effective in water/oil separation than graphene oxide.

Membranes/sheets produced from graphene oxide and reduced graphene oxide may be engineered to be impermeable to nitrogen, oxygen, and substances of lower molecular weight, while being permeable to water. Additionally, graphene oxide is known to possess surface properties that make it a good surfactant material for stabilizing emulsion systems.

Both graphene and graphene oxide have been utilized for various applications in the oil and gas industry, such as exploration, drilling, and oil recovery operations. For instance, graphene oxide has been added to drilling fluids to improve filtration properties and reduce microbial activity. Additionally, the addition of graphene to drilling fluids has shown to improve lubrication properties and thermal stability of the drilling fluids.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a reduced graphene oxide screen. The reduced includes an exterior wall having a plurality of holes therein and an interior wall having a plurality of holes therein. The plurality of holes in the exterior wall and the interior wall are substantially aligned. A reduced graphene oxide mesh is positioned between the exterior wall and the interior wall.

In another aspect, embodiments disclosed herein relate to an electrical submersible pump (ESP) system with a reduced graphene oxide screen. The ESP system includes a motor, a pump intake, a pump, and a reduced graphene oxide screen.

Other aspects and advantages of the claimed subject matter will be apparent from the following description and the appended claims.

DETAILED DESCRIPTION

In one aspect, embodiments disclosed herein relate to a reduced graphene oxide screen for use in an electrical submersible pump (ESP) system. The reduced graphene oxide screen functions to prevent emulsions from entering the ESP without the need for chemical demulsifiers.

Figure 1:
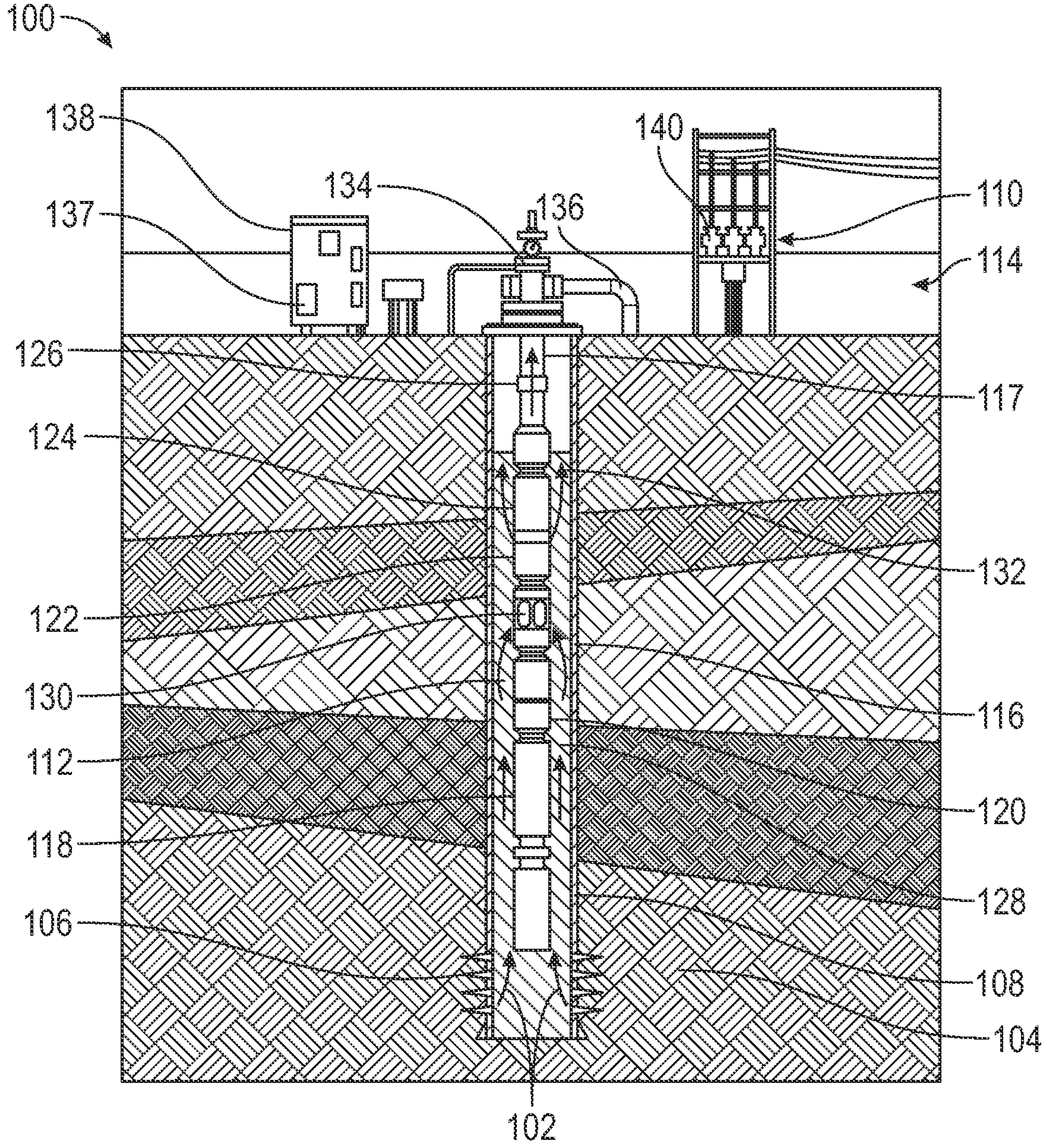
FIG. 1 is an illustration of an electrical submersible pump (ESP) system in accordance with one or more embodiments of the present disclosure.

FIG. 1 shows an exemplary ESP system 100. The ESP system 100 is one example of an artificial lift system that is used to help produce fluids 102 from a formation 104.

Perforations 106 in the well's 116 casing string 108 provide a conduit for the produced fluids 102 to enter the well 116 from the formation 104. An ESP system 100 is an example of the artificial lift system, ESP and artificial lift system may be used interchangeably within this disclosure. The ESP system 100 includes surface equipment 110 and an ESP string 112. The ESP string 112 is deployed in a well 116 and the surface equipment 110 is located on the surface 114. The surface 114 is any location outside of the well 116, such as the Earth's surface.

The ESP string 112 may include a motor 118, motor protectors 120, a gas separator 122, a multi-stage centrifugal pump 124 (herein called a "pump" 124), and an electrical cable 126. The ESP string 112 may also include various pipe segments of different lengths to connect the components of the ESP string 112. The motor 118 is a downhole submersible motor 118 that provides power to the pump 124. The motor 118 may be a two-pole, three-phase, squirrel-cage induction electric motor 118. The motor's 118 operating voltages, currents, and horsepower ratings may change depending on the requirements of the operation.

The size of the motor 118 is dictated by the amount of power that the pump 124 requires to lift an estimated volume of produced fluids 102 from the bottom of the well 116 to the surface 114. The motor 118 is cooled by the produced fluids 102 passing over the motor housing. The motor 118 is powered by the electrical cable 126. The electrical cable 126 may also provide power to downhole pressure sensors or onboard electronics that may be used for communication. The electrical cable 126 is an electrically conductive cable that is capable of transferring information. The electrical cable 126 transfers energy from the surface equipment 110 to the motor 118. The electrical cable 126 may be a three-phase electric cable that is specially designed for downhole environments. The electrical cable 126 may be clamped to the ESP string 112 in order to limit electrical cable 126 movement in the well 116. In further embodiments, the ESP string 112 may have a hydraulic line that is a conduit for hydraulic fluid. The hydraulic line may act as a sensor to measure downhole parameters such as discharge pressure from the outlet of the pump 124.

Motor protectors 120 are located above (i.e., closer to the surface 114) the motor 118 in the ESP string 112. The motor protectors 120 are a seal section that houses a thrust bearing. The thrust bearing accommodates axial thrust from the pump 124 such that the motor 118 is protected from axial thrust. The seals isolate the motor 118 from produced fluids 102. The seals further equalize the pressure in the annulus 128 with the pressure in the motor 118. The annulus 128 is the space in the well 116 between the casing string 108 and the ESP string 112. The pump intake 130 is the section of the ESP string 112 where the produced fluids 102 enter the ESP string 112 from the annulus 128.

The pump intake 130 is located above the motor protectors 120 and below the pump 124. The depth of the pump intake 130 is designed based off of the formation 104 pressure, estimated height of produced fluids 102 in the annulus 128, and optimization of pump 124 performance. If the produced fluids 102 have associated gas, then a gas separator 122 may be installed in the ESP string 112 above the pump intake 130 but below the pump 124. The gas separator 122 removes the gas from the produced fluids 102 and injects the gas (depicted as separated gas 132 in FIG. 1) into the annulus 128. If the volume of gas exceeds a designated limit, a gas handling device may be installed below the gas separator 122 and above the pump intake 130.

The pump 124 is located above the gas separator 122 and lifts the produced fluids 102 to the surface 114. The pump 124 has a plurality of stages that are stacked upon one another. Each stage contains a rotating impeller and stationary diffuser. As the produced fluids 102 enter each stage, the produced fluids 102 pass through the rotating impeller to be centrifuged radially outward gaining energy in the form of velocity. The produced fluids 102 enter the diffuser, and the velocity is converted into pressure. As the produced fluids 102 pass through each stage, the pressure continually increases until the produced fluids 102 obtain the designated discharge pressure and has sufficient energy to flow to the surface 114.

In other embodiments, sensors may be installed in various locations along the ESP string 112 to gather downhole data such as pump intake volumes, discharge pressures, shaft speeds and positions, and temperatures. The number of stages is determined prior to installation based of the estimated required discharge pressure. Over time, the formation 104 pressure may decrease and the height of the produced fluids 102 in the annulus 128 may decrease. In these cases, the ESP string 112 may be removed and resized. Once the produced fluids 102 reach the surface 114, the produced fluids 102 flow through the wellhead 134 into production equipment 136. The production equipment 136 may be any equipment that can gather or transport the produced fluids 102 such as a pipeline or a tank.

The remainder of the ESP system 100 includes various surface equipment 110 such as electric drives 137, production controller 138, the control module, and an electric power supply 140. The electric power supply 140 provides energy to the motor 118 through the electrical cable 126. The electric power supply 140 may be a commercial power distribution system or a portable power source such as a generator. The production controller 138 is made up of an assortment of intelligent unit-programmable controllers and drives which maintain the proper flow of electricity to the motor 118 such as fixed-frequency switchboards, soft-start controllers, and variable speed controllers. The production controller 138 may be a variable speed drive (VSD), well choke, inflow control valve, and/or sliding sleeves. The production controller 138 is configured to perform automatic well operation adjustments. The electric drives 137 may be variable speed drives which read the downhole data, recorded by the sensors, and may scale back or ramp up the motor 118 speed to optimize the pump 124 efficiency and production rate. The electric drives 137 allow the pump 124 to operate continuously and intermittently or be shut-off in the event of an operational problem.

Figure 2:
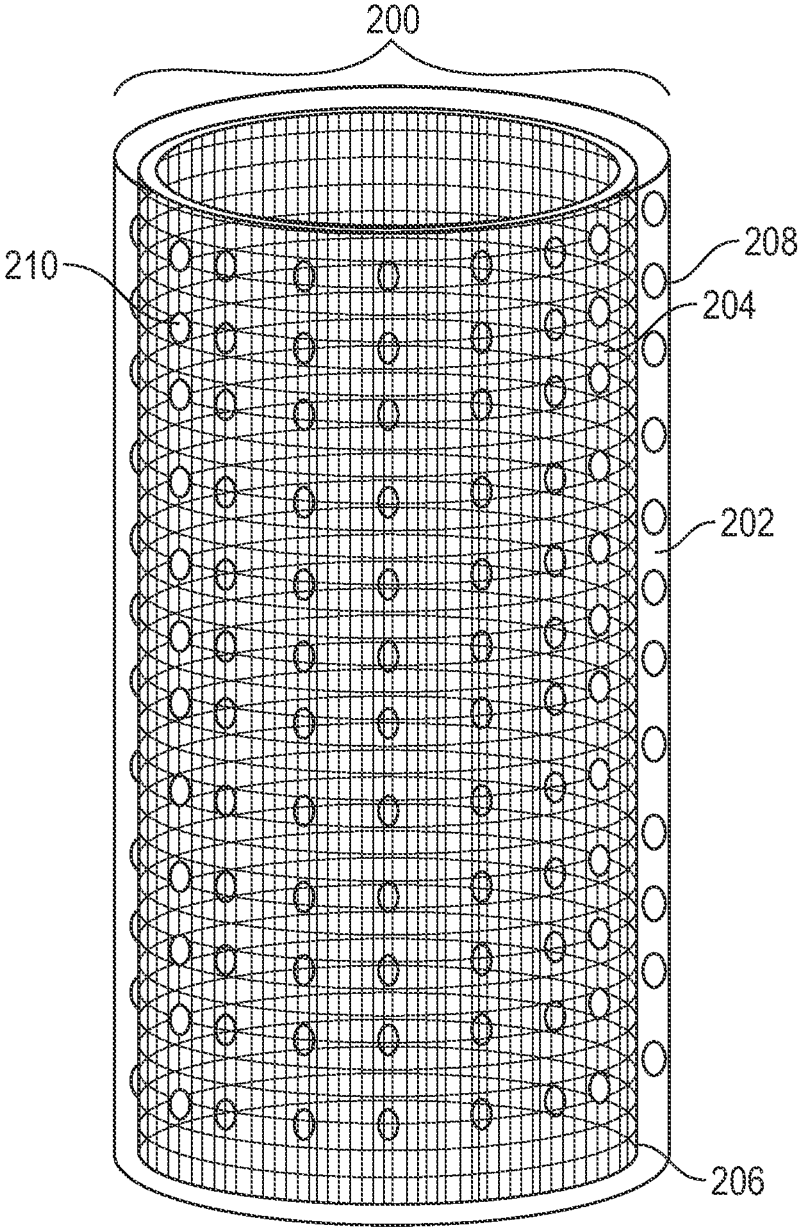
FIG. 2 is an illustration of a reduced graphene oxide screen in accordance with one or more embodiments of the present disclosure.

FIG. 2 illustrates a reduced graphene oxide screen 200 according to embodiments of the present disclosure. As described above, reduced graphene oxide is produced through the processing of graphene oxide by various methods known to one skilled in the art. It is a hydrophobic material and is known to be effective in breaking water and oil emulsions. In one or more embodiments, the reduced graphene oxide screen 200 is an elongated, hollow body with a tube-like structure. In some embodiments, the reduced graphene oxide screen 200 is cylindrical in shape. The reduced graphene oxide screen 200 comprises an exterior wall 202, an interior wall 204, and a mesh 206 comprised of reduced graphene oxide. Both the exterior wall 202 and the interior wall 204 may be comprised of a hard, durable material, such as carbon steel. As appreciated by one skilled in the art, other materials may also be utilized, such as other types of metals or durable plastics. In one or more embodiments, each of the exterior wall 202 and interior wall 204 have a thickness ranging from 3 millimeters (mm) to 6 mm.

Figure 3:
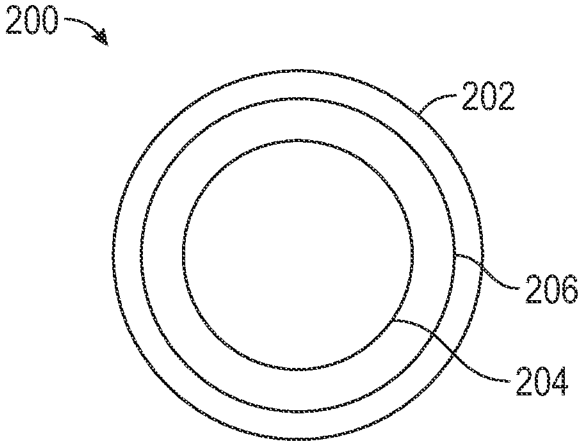
FIG. 3 is a top-view illustration of the reduced graphene oxide screen in accordance with one or more embodiments of the present disclosure.

FIG. 3 depicts a top-view of the reduced graphene oxide screen 200. The reduced graphene oxide mesh 206 fits securely between the exterior wall 202 and the interior wall 204 such that the reduced graphene oxide mesh 206 is fixed in place while hydrocarbons are streaming towards the pump intake. The exterior wall 202 and interior wall 204 serve to stabilize and protect the reduced graphene oxide mesh 206. The reduced graphene oxide mesh 206 may be connected with the exterior and interior walls 202 and 204 through an attachment mechanism (e.g., adhesive). Alternatively, the reduced graphene oxide screen 200 may be manufactured such that the exterior wall 202, the interior wall 204, and the reduced graphene oxide mesh 206 are manufactured tightly together such that a separate attachment mechanism is not needed. In some embodiments, the reduced graphene oxide screen 200 is added during the manufacturing of the ESP system 100. In other embodiments the reduced graphene oxide screen 200 may be added to an existing ESP system 100.

Referring to FIG. 2, both the exterior wall 202 and the interior wall 204 include a plurality of holes 208 and 210, respectively, distributed uniformly throughout each wall. The holes 208 and 210 are formed such that the holes 208 in the exterior wall 202 are substantially aligned with the holes 210 in the interior wall 204. In one or more embodiments, the spacing between holes 208 and 210 in the exterior and interior walls 202 and 204 is approximately one inch. The number of holes 208 and 210 may range from 30 openings to 120 openings depending on the outer diameter and height of the ESP pump intake. During use, hydrocarbons pass through the holes 208 distributed across the exterior wall 202 and then pass through the reduced graphene oxide mesh 206. The reduced graphene oxide mesh 206 removes any emulsions present in the hydrocarbons, and the hydrocarbons will finally pass through the holes 210 in the interior wall 204 before proceeding to the ESP pump intake free of emulsions. Since the reduced graphene oxide screen 200 prevents the entrance of oil-water emulsions in the ESP pump intake, pump malfunctions due to emulsions are mitigated.

Figure 4:
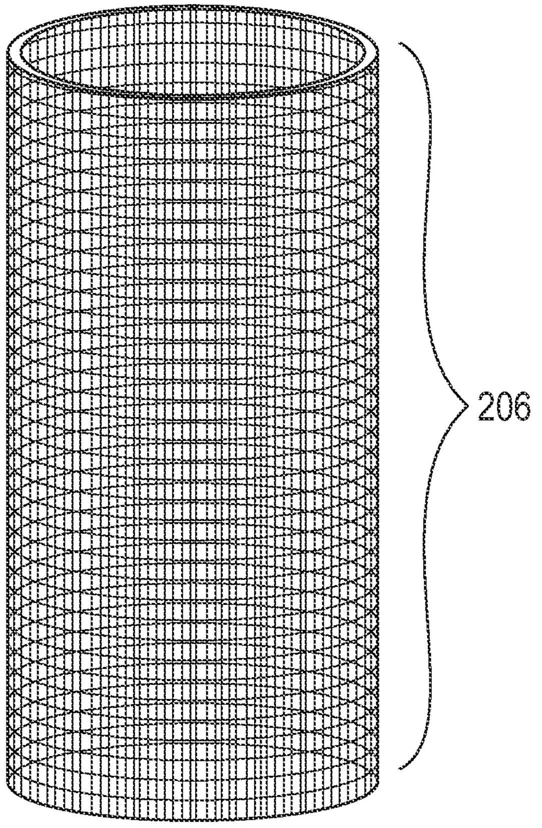
FIG. 4 is an illustration of a reduced graphene oxide mesh in accordance with one or more embodiments of the present disclosure.

FIG. 4 depicts the reduced graphene oxide mesh 206. As shown, the reduced graphene oxide mesh 206 comprises openings within the mesh. In one or more embodiments, the openings are between 80 and 120 U.S. standard mesh size.

Figure 5:
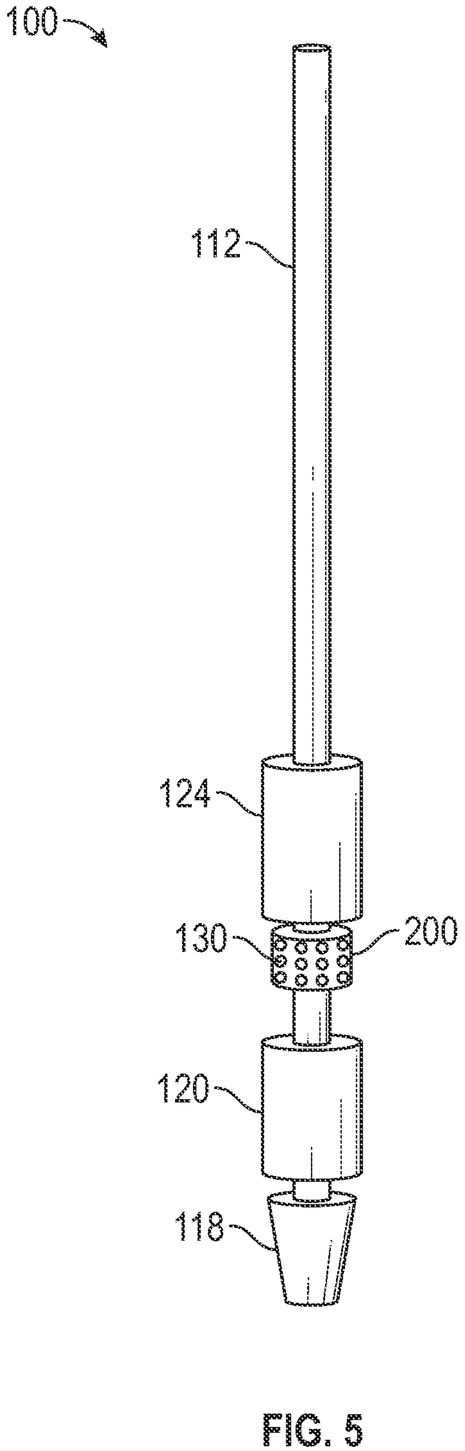
FIG. 5 is an illustration of an ESP system with reduced graphene oxide screen in accordance with one or more embodiments of the present disclosure.

FIG. 5 shows an ESP system 100 with the reduced graphene oxide screen 200 incorporated as part of the system. As shown, the reduced graphene oxide screen 200 is positioned around the ESP pump intake 130, which is arranged below the multi-stage centrifugal pump 124. The reduced graphene oxide screen 200 may be attached with one or more components of the ESP system 100 via any suitable attachment mechanism, including adhesive, screws, and welding. In some embodiments, the reduced graphene oxide screen 200 is attached directly to the ESP pump intake 130.

The reduced graphene oxide screen 200 is formed such that the dimensions of the reduced graphene oxide screen 200 (diameter or perimeter) are greater than the dimensions (diameter or perimeter) of the ESP pump intake 130 such that the reduced graphene oxide screen 200 may be positioned around the ESP pump intake 130. In some embodiments, the reduced graphene oxide screen 200 may surround the entire ESP pump intake 130. In other embodiments, the reduced graphene oxide screen 200 may surround a portion of the ESP pump intake 130. In some embodiments, the outer diameter of the reduced graphene oxide screen 200 may be between 2 inches and 8 inches, such as between 3.375 inches and 5.375 inches. In some embodiments, the height of the reduced graphene oxide screen 200 may be between 10 inches and 30 inches, such as between 12 inches and 24 inches.

In order to ensure that the reduced graphene oxide screen is functioning properly prior to its installation in a well completion, testing may be performed to monitor the demulsification capabilities of the reduced graphene oxide screen. After the first installation, the ESP system may trip if an excessive amount of emulsion enters the pump stages, which will indicate the reduced graphene oxide screen is not functioning as intended. In addition, the ESP system may be electively pulled from the well following the first reduced graphene oxide screen installation in order to inspect the equipment for any effect, if any, resulting from the presence of emulsion in the ESP pump stages.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A pump system, comprising:
- a motor;
- a pump intake;
- an electrical submersible pump; and
- a reduced graphene oxide screen attached with and positioned around the pump intake, comprising:
  - an exterior carbon steel wall having a plurality of holes therein;
  - an interior carbon steel wall having a plurality of holes therein,
  - wherein the plurality of holes in the exterior wall and the interior wall are substantially aligned; and
  - a reduced graphene oxide mesh positioned between the exterior carbon steel wall and the interior carbon steel wall,
- wherein the reduced graphene oxide screen is configured to prevent emulsions from entering the pump intake.

2. The pump system according to claim 1, wherein a diameter of the reduced graphene oxide screen is greater than a diameter of the pump intake.

3. The pump system according to claim 1, wherein each of the exterior wall, the interior wall, and the reduced graphene oxide mesh is an elongated, hollow body having a tube-like structure.

4. The pump system according to claim 1, wherein the reduced graphene oxide screen is formed to be cylindrical in shape.

* * * * *